C. J. PILLING & G. S. WHITE.
SPHYGMOMANOMETER.
APPLICATION FILED JAN. 9, 1915.
1,154,934.
Patented Sept. 28, 1915.
2 SHEETS—SHEET 2.
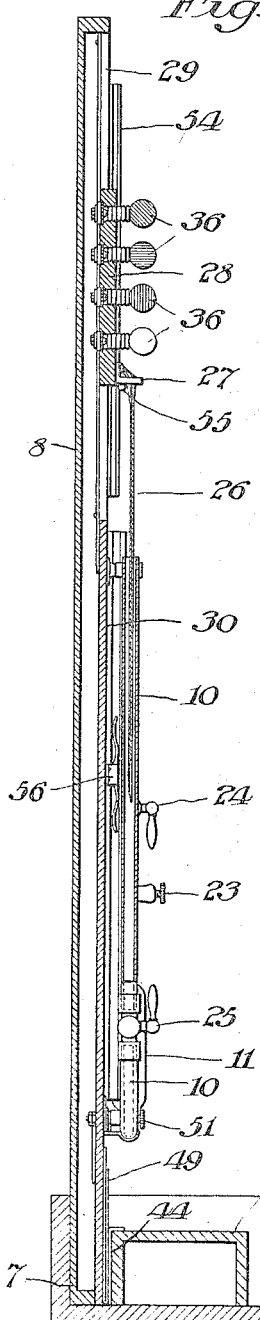
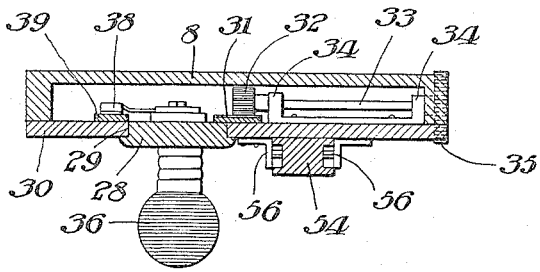
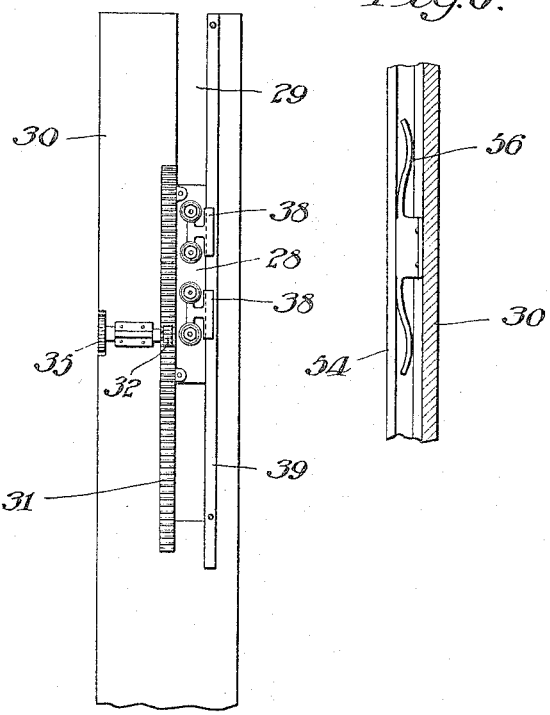
Inventors:
Charles J. Pilling
and George S. White.

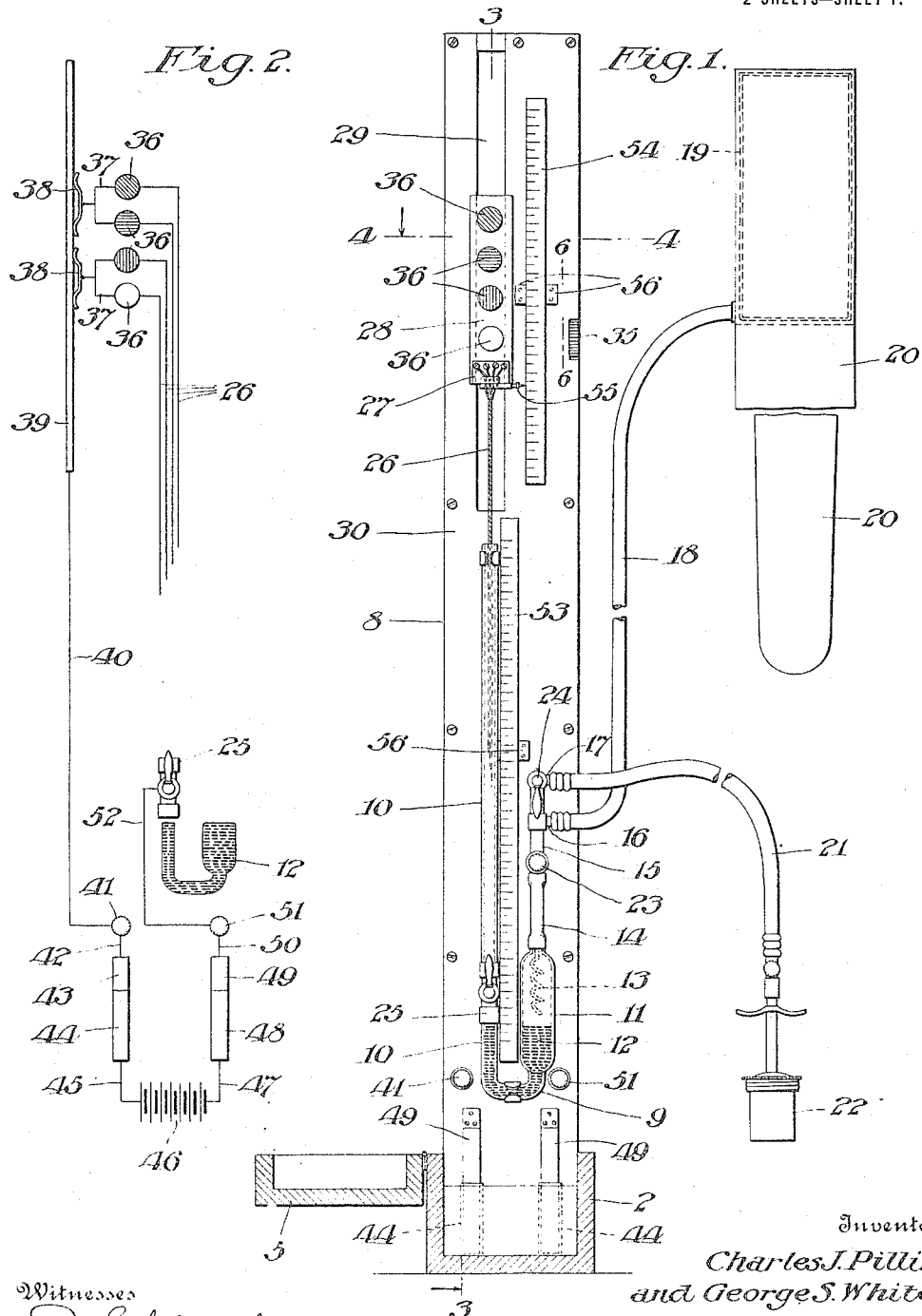

E3T AVAILABLE COPY

UNITED STATES PATENT OFFICE.

CHARLES J. PILLING, OF LANSDOWNE, PENNSYLVANIA, AND GEORGE S. WHITE, OF LOS ANGELES, CALIFORNIA, ASSIGNORS TO GEORGE P. PILLING AND SON CO., OF PHILADELPHIA, PENNSYLVANIA, A CORPORATION OF PENNSYLVANIA.

SPHYGMOMANOMETER.

1,154,934. Specification of Letters Patent. Patented Sept. 28, 1915.

Application filed January 9, 1915. Serial No. 1,277.

*To all whom it may concern:*

Be it known that we, CHARLES J. PILLING, a citizen of the United States, residing at Lansdowne, county of Delaware, and State of Pennsylvania, and GEORGE S. WHITE, a citizen of the United States, residing in the city and county of Los Angeles and State of California, have invented certain new and useful Improvements in Sphygmomanometers, of which the following is a specification.

Our invention relates to improvements in pressure gages or manometers, generally, and particularly to improvements in sphygmomanometers of the type employing a mercury manometer, a band having an air sack adapted to be applied to a part of the human body, a pneumatic connection between the manometer and the air sack of the band, and an air pump connected to the pneumatic system which includes the manometer and the air sack. In this type of apparatus, the band is adapted to be applied around a part of the human body with the air sack over an artery of the patient and between a portion of the band and the artery, so that when air is introduced to the pneumatic system, in the usual well known manner to properly act against the blood pressure in the artery, the air pressure will also act against the mercury in the manometer in a manner to indicate on the manometer scale, the blood pressure in the artery, and the changes that occur therein, and thus indicate the conditions of the blood circulation. When air is introduced to the pneumatic system of sphygmomanometer of the foregoing type, a column of mercury ascends in a glass indicating tube of the manometer, in accordance with the air pressure, and the top of the column of mercury in the tube indicates on an adjacent scale the changing degrees of air pressure in the pneumatic system. In reading the degree of pressure indicated on the scale and in reading the changing degrees caused by variations in the pressure, it is not only necessary that the reader be quite close to the instrument but it is also necessary in obtaining accurate readings for the reader to bring his line of vision into the same horizontal plane with the top of the column of mercury, at each reading, owing to the intervening space between the top of the mercury and the adjacent scale.

The object of our invention is to improve pressure gages generally, and, particularly, to improve the foregoing type of instrument by the provision of novel, simple and efficient means: first, whereby pressure readings are rendered more accurate and less difficult than heretofore; secondly, whereby separate indicating means for different pressure degrees may be placed farther apart than the distance between the corresponding levels of the mercury column to facilitate reading at a greater distance from the instrument than heretofore; thirdly, whereby different pressure degrees may be indicated by either visual or audible means to persons at much greater distances from the instrument than heretofore, or to all persons constituting a large or small audience; fourthly, whereby different means indicating different pressure degrees, may have different characteristics, enabling them to be readily distinguished from each other; and, fifthly, whereby various novel and advantageous results may be obtained.

Accordingly, our invented apparatus consists of the elements thereof and the combinations of them hereinafter fully described and claimed.

In the accompanying drawings, illustrating our invention, Figure 1 is a front elevation, partly in section, of a blood pressure apparatus embodying our invention. Fig. 2 is a diagrammatic view illustrating the electrical connections. Fig. 3 is a vertical section on line 3—3 of Fig. 1. Fig. 4 is a horizontal section, on line 4—4 of Fig. 1. Fig. 5 is a rear view of a portion of the front wall of the standard showing the lamp carriage mounted therein and adjuncts. Fig. 6 is a sectional detail on line 6—6 of Fig. 1 showing one of the supporting springs for one of the scales.

Referring to the drawings, 2 designates a box or casing having a suitable hinged lid 5 and being adapted to contain our improved instrument when not in use and to serve as a supporting base therefor when in use. One end of the box 2 is provided with a socket 7 adapted to receive the lower end of a support or standard 8, when the box 2 is open, and support the standard in a vertical position, as clearly shown in Figs. 1 and 2.

Suitably secured on the standard 8 is a mercury manometer 9 comprising a vertically-extending glass indicating tube 10 and a mercury container 11 laterally adjacent to the tube 10 and communicating with the bottom thereof. The mercury 12 is contained within the lower portions of the tube 10 and container 11 and the container 11 is adapted to receive air pressure above the normal level of the mercury 12 and force a column of mercury up through the indicating tube 10 in the usual well known manner. The top of the container 11 is connected to a tube 13 which extends down into the container and has a lower discharge end spaced from the walls of the container, as shown, and the top of the tube 13 is connected by a tube 14 to a short rigid pipe 15 which is secured to the standard 8.

The pipe 15 is provided with two outwardly projecting nipples 16 and 17, the lower nipple 16 being connected by a flexible tube 18 to the air sack 19 of a suitable band or tourniquet 20, and the upper nipple 17 being connected by a flexible tube 21 to a suitable air supplying means or pump 22. The pipe 15 is provided with a suitable needle valve 23 to control the discharge of air from the pneumatic system in which is included the mercury container 11 and the air sack 19 of the tourniquet 20. The pipe 15 is also provided with a suitable valve 24 by means of which communication between the said pneumatic system and the air supplying device 22 may be opened and closed.

The glass indicating tube 10 is interrupted by a metal valve 25 a slight distance above the normal level of the mercury 12, the valve 25 being adapted to be opened to permit a column of mercury to ascend within the tube 10 when the instrument is in use, and to be closed to prevent the spilling of the mercury from the open upper end of the tube 10 when the instrument is inverted or carried about. The tube 13 hereinbefore described, prevents the mercury 12 from leaving the container 11 through the tube 14 when the instrument is inverted or carried about and when the air pressure is quickly exhausted from the container 11. The metal valve 25 also serves as a means of making an electrical connection with the mercury 12 when it is forced up through the valve 25, as will be hereinafter explained.

Extending down into the tube 10 through the open upper end thereof is a plurality of electrical conducting wires 26, the upper ends of which are suitably secured to an insulating block 27. The block 27 is secured to a carriage 28 which is formed of insulating material and which is fitted to slide vertically in a suitable guideway 29 formed in the standard 8 which is preferably formed of wood or other suitable insulating material, and which is made hollow and has a removable front wall 30 in which the guide way 29 is formed, as shown. The carriage 28 is provided with a gear rack 31 which extends vertically within the standard 8 and is engaged by a gear wheel 32 on the inner end of a shaft 33 which is fitted to turn in bearings 34 on the inner face of the front wall 30 of the standard 8. The outer end of the shaft 33 carries a conveniently located hand wheel 35 by means of which the shaft 33 may be turned to cause the gear wheel 32 to raise and lower the carriage 28 and thereby raise and lower the wires 26 within the indicating tube 10 of the manometer 9.

The wires 26 are insulated from each other, and the lower ends thereof are arranged at different distances above the normal level of the mercury 12, the lower ends of the wires 26 being exposed to electrical contact with the mercury 12 when it is forced up through the indicating tube 10 and meets the wires 26. Each wire 26 is connected to an electric translating device 36, which may be a lamp, as shown, or which may be a suitable bell, or any other form of device having visual or audible means of indicating the supply of electric current thereto. The lamps or devices 36 are connected by wires 37 to suitable spring brushes 38 which are mounted on the carriage 28 and press slidably against a contact bar 39 fixed on the inner face of the front wall 30 of the standard 8, whereby, when the carriage 28 is raised and lowered, the brushes 38 will slide against the bar 39 and connect it electrically with the devices or lamps 36 at all times. The contact bar 39 is connected by a wire 40 to a binding post 41 on the standard 8, and the post 41 is connected by a wire 42 to a contact plate 43 engaging a contact plate 44 which is connected by a wire 45 to one pole of a suitable electric battery 46. The other pole of the battery 46 is connected by a wire 47 to a contact plate 48 engaging a contact plate 49 which is connected by a wire 50 to a binding post 51 on the standard 8, and the post 51 is connected by a wire 52 to the metal valve 25. It will thus be seen that when the mercury 12 is forced up through the indicating tube 10 and into contact with the wires 26, an electric circuit will be completed through the battery 46, wire 47, plates 48 and 49, wire 50, binding post 51, wire 52, valve 25, mercury 12, wires 26, translating devices 36, wires 37, brushes 38, bar 39, wire 40, binding post 41, wire 42, plates 43 and 44 and wire 45, and that the devices 36 will be included in the circuit in series. It will also be seen that, as the mercury rises and makes contact with the lower ends of the wires 24 successively, the translating devices or indicators 36, connected to the respective wires 26 will be successively energized; and that as the mercury falls and breaks contact with the wires 26 successively, in inverse order, the devices 36 will be deënergized successively, in the same inverse order.

Adjacent to the indicating tube 10 of the manometer is a scale 53 on which the pressure in the pneumatic system is indicated by the level of the mercury column in the tube 10; and adjacent to the carriage 28 is a scale 54 having marks or graduations thereon corresponding with marks on the scale 53. The scales 53 and 54 are so related to each other and to the wires 26 and a pointer 55 on the carriage 28 that when the carriage 28 has been adjusted to bring the pointer 55 into registry with a particular mark on the scale 54 the mercury 12 will make contact with the lowermost wire 26 when the mercury reaches the level of a corresponding mark on the scale 53. Therefore, it will be understood that the carriage 28 may be readily adjusted to set the wires 26 into the proper position to energize the first or lowermost indicator 36 when the mercury column reaches any particular level. The scales 53 and 54 are held in place between friction springs 56 and the front wall 30 of the standard 8, the springs 56 being secured to the wall 30 and extending into side grooves in the scales 53 and 54; and the scales are slidably engaged with the springs 56 so that the scales may be adjusted vertically to bring them into proper relation to the mercury level for the purposes hereinbefore described.

Any desired number of the wires 26 and indicators 36 may be employed, and the lower ends of the wires 26 may be spaced any desired distances corresponding with the relative mercury levels at which it is desired to energize the indicators, successively, after the carriage 28 has been set to energize the first indicator at a particular mercury level.

The translating devices or indicators 36 may have characteristics which distinguish them from each other, such as color differences, in case of visual indicators, and tone or sound differences, in case of audible indicators, so that as the mercury reaches the different levels of the lower ends of the wires 26, the degrees of pressure in the pneumatic system, corresponding with such mercury levels, will be indicated to all persons within hearing or seeing distance of the instrument.

When the instrument is used to indicate the blood pressure of a patient and the changes that occur therein, the band 20 is placed around a suitable part of the body or limb of a patient with the air sack 19 in the proper relation to an artery, in the usual manner. Air is then introduced to the pneumatic system by the pump 22 and the valves are manipulated until the relation of the air pressure to the blood pressure is such that the rising and falling of the blood pressure, due to the action of the heart, will cause the mercury column in the indicating tube 10 to rise and fall in accordance therewith. The carriage 28 is then adjusted to bring the lower ends of the wires 26 into such relation to the excursions of the top of the mercury column that various changes in the conditions of the blood circulation will be indicated not only on the scale 53 by the different mercury levels, but also by the energizing and deënergizing of the indicators 36. Thus our improved instrument may be used for such purposes as indicating human energy, mental excitement and many other conditions of persons as are evidenced by changes in the conditions of the blood circulation.

The battery 46 is contained within a box 58 within the casing 2, and when the instrument is not in use, the standard 8 is removed from the socket 7 and the standard and parts mounted thereon are placed horizontally within the casing 2. It will, therefore, be understood that the contact plates 44 and 48, secured to the box 2, and the contact plates 43 and 49, secured to the standard 8, permit the making and breaking of the electrical connections between the battery 46 and the standard 8, as the standard is placed within and removed from the socket 7. The purpose of providing the binding posts 41 and 51 is to permit the poles of a battery to be connected to the wires 40 and 52 of the standard 8, should it be desired to hang the standard upon a wall or to support it in any place and by any means other than the casing 2 illustrated herein, when the instrument is in use.

We claim:

1. The combination of a support, a mercury manometer mounted on the support and having an indicating tube receiving a column of mercury and having means to supply pressure thereto and thereby elevate the mercury column, a wire extending down into said indicating tube and having its lower end above the normal level of the mercury, means operative to adjust said wire vertically within said tube, means to indicate different positions of adjustment of said wire relatively to the level of said mercury, an electric circuit including the mercury in said manometer and said wire, said circuit being normally open between said mercury and said wire, and a translating device included in said circuit.

2. The combination of a support, a mercury manometer mounted on the support and having an indicating tube receiving a column of mercury and having means to supply pressure thereto and thereby elevate the mercury column, a wire extending down into said indicating tube and having its lower end above the normal level of the mercury, means operative to adjust said wire vertically within said tube, an electric circuit including the mercury in said manometer and said wire, said circuit being normally open between said mercury and said wire, and a translating device included in said circuit.

3. The combination of a support, a mercury manometer mounted on the support and having an indicating tube receiving a column of mercury and having means to supply pressure thereto and thereby elevate the mercury column, a plurality of electrical conducting wires insulated from each other and extending down into said indicating tube and having their lower ends arranged at different distances above the normal level of the mercury, each wire having an electrical translating device connected thereto, said wires being secured in fixed relation to each other and being bodily movable, means operative to bodily adjust said wires vertically within said tube, and an electric circuit including said wires and said devices in parallel and said mercury, said circuit being normally open between said wires and said mercury.

4. The combination of a support, a mercury manometer mounted on the support and having an indicating tube receiving a column of mercury and having means to supply pressure thereto and thereby elevate the mercury column, a plurality of electrical conducting wires insulated from each other and extending down into said indicating tube and having their lower ends arranged at different distances above the normal level of the mercury, each wire having an electrical translating device connected thereto, said devices having characteristics which distinguish them from each other, said wires being secured in fixed relation to each other and being bodily movable, means operative to bodily adjust said wires vertically within said tube, and an electrical circuit including said wires and said devices in parallel and said mercury, said circuit being normally open between said wires and said mercury.

5. The combination of a support, a mercury manometer mounted on the support and having an indicating tube receiving a column of mercury and having means to supply pressure thereto and thereby elevate the mercury column, a vertically adjustable carriage on said support, a wire secured to said carriage and extending downwardly therefrom into said indicating tube and having its lower end above the normal level of the mercury, an electric circuit including the mercury in said manometer and said wire, said circuit being normally open between said mercury and said wire, and a translating device mounted on said carriage and included in said circuit.

6. The combination of a support, a mercury manometer mounted on the support and having an indicating tube receiving a column of mercury and having means to supply pressure thereto and thereby elevate the mercury column, a vertically adjustable carriage on said support, a wire secured to said carriage and extending downwardly therefrom into said indicating tube and having its lower end above the normal level of the mercury, a contact bar mounted on said support, a brush carried by said carriage and engaging said contact bar, an electrical translating device mounted on said carriage, and an electric circuit including said wire, said bar, said brush, said device and the mercury in said manometer, said circuit being normally open between said wire and said mercury.

7. The combination of a support, a mercury nanometer mounted on the support and having an indicating tube receiving a column of mercury and having means to supply pressure thereto and thereby elevate the mercury column, a vertically adjustable carriage on said support, a plurality of electrical conducting wires secured to said carriage and insulated from each other and extending down into said indicating tube and having their lower ends arranged at different distances above the normal level of the mercury, each wire having an electrical translating device connected thereto and mounted on said carriage, a contact bar mounted on said support, and slidable connections between said devices and said bar, said wires, said devices, said connections, said bar and said mercury being included in an electric circuit normally open between said wires and said mercury, and said wires and said devices being connected in parallel in said circuit.

8. The combination of a support, a mercury manometer mounted on the support and having an indicating tube receiving a column of mercury and having means to supply pressure thereto and thereby elevate the mercury column, a vertically adjustable carriage on said support, a plurality of electrical conducting wires secured to said carriage and insulated from each other and extending down into said indicating tube and having their lower ends arranged at different distances above the normal level of the mercury, said wires, said devices and said mercury being included in an electric circuit normally open between said wires and said mercury, said wires and said devices being connected in parallel in said circuit, and said circuit having parts mounted on said support and said carriage and making slidable contact.

9. The combination of a support, a mercury manometer mounted on the support and having a glass indicating tube receiving a column of mercury and having means to supply pressure thereto and thereby elevate the mercury column, said tube being provided with a valve above the normal level of the mercury and adapted to control the passage of mercury through the tube, a wire extending down into said tube and having its lower end above said valve, and an electrical translating device, said wire, said mercury and said device included in an electric circuit normally open between said wire and said mercury.

10. The combination of a support, a mercury manometer mounted on the support and having a glass indicating tube receiving a column of mercury and having means to supply pressure thereto and thereby elevate the mercury column, said tube being provided with a valve above the normal level of the mercury and adapted to control the passage of mercury through the tube, said valve having a metal part adapted to contact with the mercury in said tube, a wire extending down into said tube and having its lower end above said valve, and an electrical translating device, said wire, said device and said part being included in an electric circuit normally open between said wire and said part and adapted to be closed by said mercury.

11. The combination of a support, a mercury manometer mounted on the support and having an indicating tube receiving a column of mercury and having means to supply pressure thereto and thereby elevate the mercury column, a vertically adjustable carriage on said support, a wire secured to said carriage and extending downwardly therefrom into said indicating tube and having its lower end above the normal level of the mercury, a rotatable part, means operated by said part for adjusting said carriage, an electrical translating device, and an electric circuit including said mercury, said wire and said device, said circuit being normally open between said mercury and said wire.

In testimony whereof we affix our signatures in the presence of two witnesses.

CHARLES J. PILLING.
GEORGE S. WHITE.

Witnesses to signature of Charles J. Pilling:
  S. I. HARPER,
  A. V. GROUPE.

Witnesses to signature of George S. White:
  GEO. E. REID,
  J. W. LAYCOCK.